Dec. 4, 1934.  C. R. LOTHROP ET AL  1,982,917
DISPENSING APPARATUS
Filed Nov. 5, 1932  2 Sheets-Sheet 1
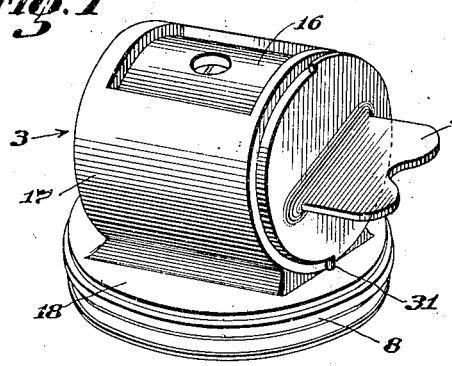
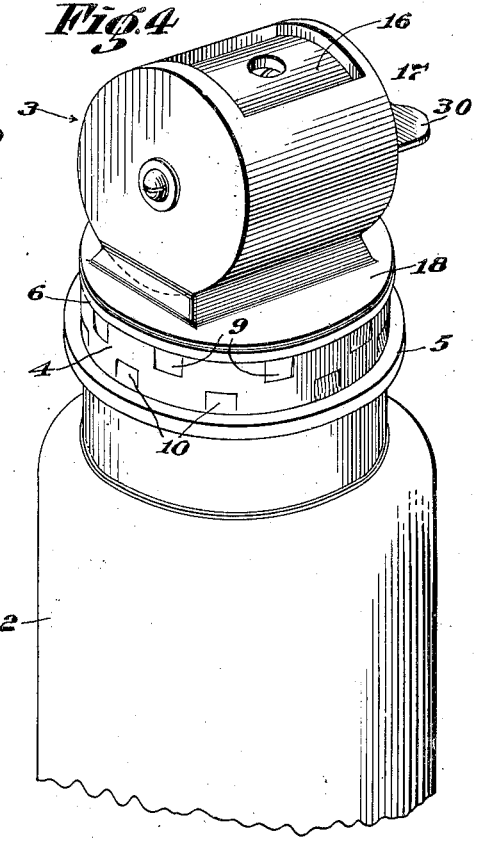
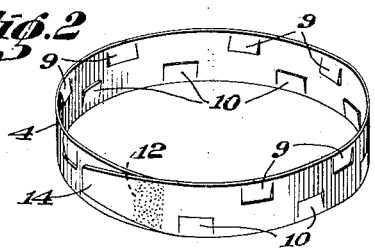
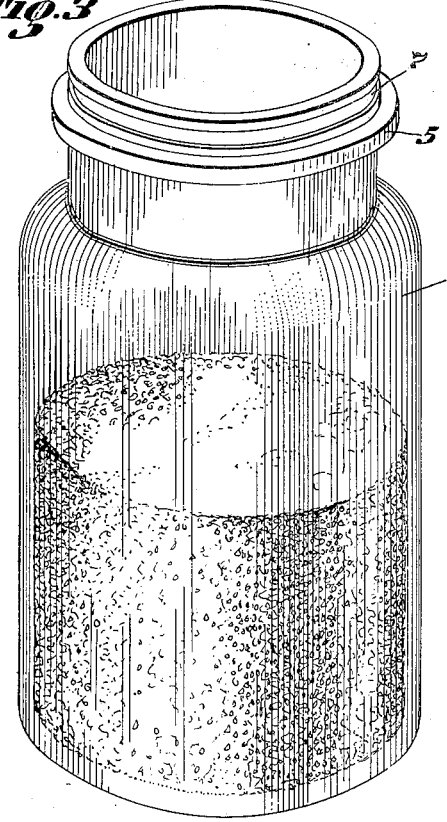
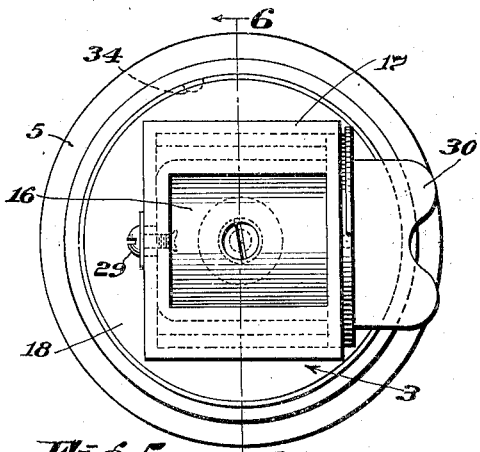

Dec. 4, 1934.  C. R. LOTHROP ET AL  1,982,917
DISPENSING APPARATUS
Filed Nov. 5, 1932   2 Sheets-Sheet 2
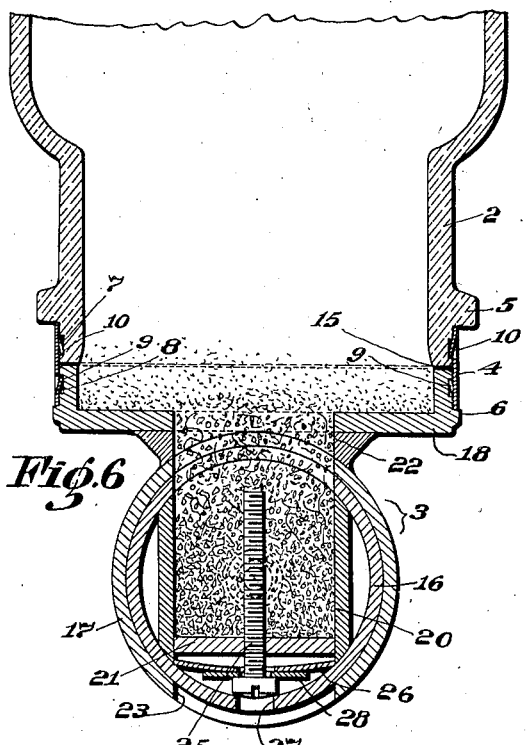
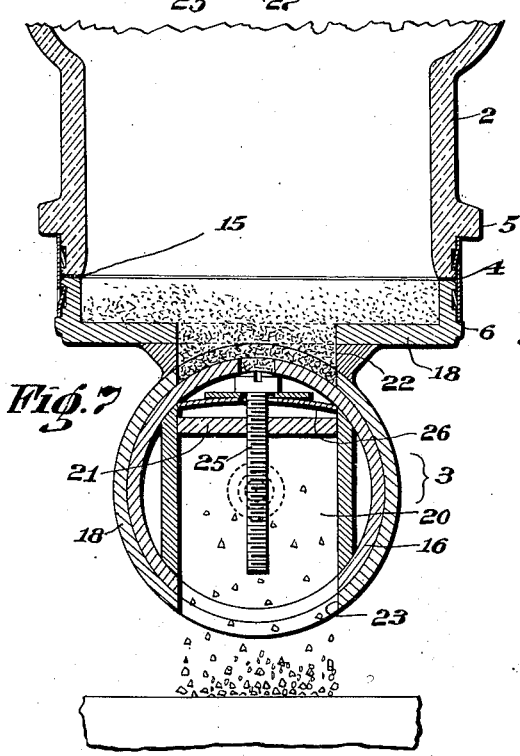
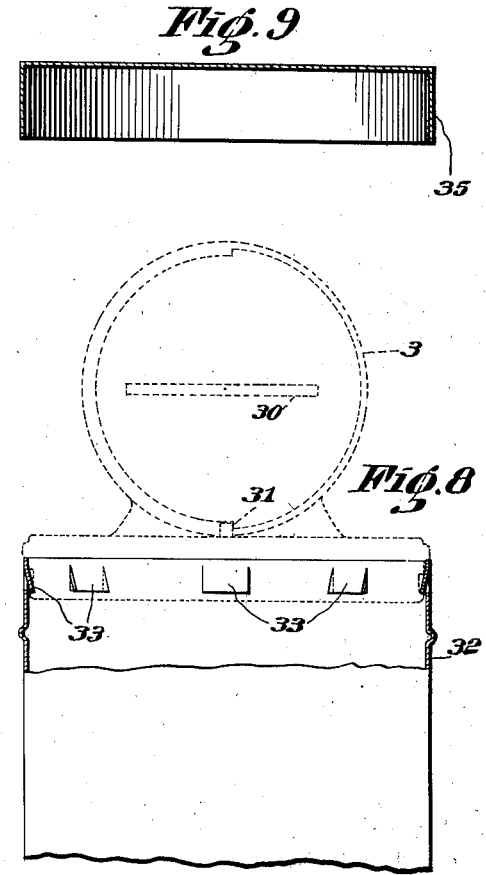
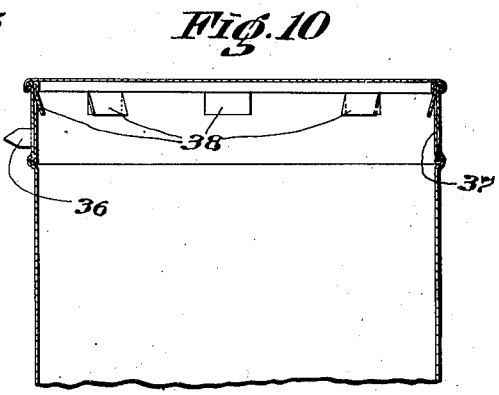

Patented Dec. 4, 1934

1,982,917

UNITED STATES PATENT OFFICE 1,982,917

DISPENSING APPARATUS

Charles R. Lothrop, Milton, and Oswald Cammann, Weston, Mass.

Application November 5, 1932, Serial No. 641,460

10 Claims. (Cl. 221—107)

This invention relates to dispensing apparatus. It is especially, but not exclusively, concerned with apparatus of this type designed for the handling of coffee in a dry or granular form.

It is the customary practice for some concerns that merchandise coffee to sell this product in the bean to the retailers who, in turn, grind it to the order of their customers and put it up in paper bags as each sale is made. Another practice commonly followed is to grind the coffee at the roasting plant and to put up measured quantities in tin containers or cans which are tightly sealed so as to preserve the freshness and aroma of the coffee. Sometimes, in addition, the coffee is sealed under a vacuum or in an atmosphere of an inert gas, such as nitrogen, carbon dioxide, or the like. The producers and distributors thus take much care to deliver the coffee to the retail purchaser in a fresh condition. Their control over it, however, ends when the sale has been made and the goods are delivered. The housewife or maid usually places a new supply of coffee in a jar or similar container and she takes a suitable quantity from the container whenever she prepares coffee for the table. No attempt is made to make such containers air tight, and consequently, much of the aroma and freshness of the coffee is lost before any great proportion of the supply has been used. This fact, together with the variations in measuring the quantity of dry coffee used in making successive brews or batches of the beverage, is chiefly responsible for the common complaint as to the difference in taste of successive brews of the beverage made from the same supply of dry coffee.

The present invention is especially concerned with these conditions and it aims to devise an apparatus for overcoming these difficulties. It is also an object of the invention to provide a dispensing apparatus which can be used in connection with the product of an individual proprietor, but which cannot be used with other products, so that the care which a proprietor exercises in supplying a high grade product to his trade can be carried forward into the kitchen of the user with the object of producing a better and more uniform cup of coffee and contributing to the satisfaction of the ultimate consumer.

The nature of the invention will be readily understood from the following description when read in connection with the accompanying drawings, and the novel features will be particularly pointed out in the appended claims.

In the drawings,

Figures 1, 2 and 3 are perspective views of the three elements of a measuring container constructed in accordance with this invention;

Fig. 4 is a perspective view of the assembled container, the lower part of the jar being broken away;

Fig. 5 is a plan view of the container shown in Figs. 1 and 4;

Fig. 6 is a sectional view on the line 6—6, Fig. 5;

Fig. 7 is a view similar to Fig. 6 but illustrating the manner in which the dispensing operation is performed;

Fig. 8 is a side elevation, partly in section, of a different form of container adapted for the attachment thereto of the measuring device shown in Fig. 1, said device being shown in dotted lines;

Fig. 9 is a sectional view of a cover for the container shown in Fig. 8; and

Fig. 10 is a sectional view of the upper part of another form of container adapted for use with the measuring device shown in Fig. 1.

Referring first to Figs. 1 to 7, inclusive, the apparatus there shown comprises a container 2, which may conveniently take the form of a glass jar, a volumetric measuring device indicated in general at 3, and a sheet metal locking ring 4 for securing the parts 2 and 3 non-releasably to each other. For this purpose the jar 2 is provided with a circumferential enlargement or collar portion 5 against which the lower end of the ring 4 abuts, and the measuring device has a corresponding circumferential member 6 against which the upper end of the ring bears. Between the portions 5 and 6 the surface of the jar 2 and of the base of the measuring device 3 are of generally cylindrical form and of substantially the same diameter, but the cylindrical surface of the jar is interrupted by a circumferential groove 7, while the corresponding surface of the measuring device is interrupted by a similar groove 8. The shoulders of these grooves adjacent to each other are made square or at right angles with reference to the cylindrical surfaces of the parts or else are slightly undercut, and the locking ring 4 is provided with upper and lower series of inwardly bent integral spring fingers 9 and 10, respectively, which snap into the two grooves 8 and 7, respectively, with the free ends of the lugs in engagement with the shoulders just mentioned. It will be clear from an inspection of Figs. 4 and 6 that when the parts are in this relationship the measuring device 3 will be secured firmly to the jar or container 2. Furthermore, due to the nature of the construction it is practically impossible for a person to remove the measuring device from the container without either destroying one of the elements 2, 3 or 4, or at least so mutilating it that it cannot be used for further for its intended function.

The measuring device must, however, be released from the jar in order to permit the refilling of the jar when the supply of coffee in it has become exhausted. For this purpose the ring 4 is made with a breakable portion so that it can be taken off easily but will be destroyed in so doing. As shown in Fig. 2 the ring is made from a long narrow strip of sheet metal and the two end portions are overlapped one upon the other and secured together by a soldered union 12, the extreme tip 14 of one end being left free and preferably being tapered to receive a winding key of the type commonly used in winding up the tear strip or rip strip of a tin can so that this end portion can easily be wound in the same manner and by a similar key sufficiently to break the soldered joint 12. This destroys the ring and permits the separation of the parts 2 and 3 from each other.

In using this apparatus it is contemplated that when the housewife purchases a fresh supply of coffee she will transfer it immediately from the bag, can, or other container in which it has been sold to the jar 2. With this purchase a ring 4 will be given her. After filling the jar with the coffee she places the ring over the top of the jar and forces it down until it strikes the shoulder 5, this movement resulting in snapping the lugs 10 into the groove 7. She then inserts the lower reduced end of the base of the measuring device in the top of the ring and presses it down until it brings up on the shoulder 6. Before this occurs, however, the rings 9 will have snapped into the groove 8, thus locking the measuring device and the jar securely together. Preferably a rubber gasket 15 is introduced between the meeting ends of the parts 2 and 3 to reduce air leakage through this joint.

The measuring device, in the specific form shown, comprises a cylinder 16, closed at its opposite ends, and mounted to revolve in a cylindrical casing 17. The casing is made integral with or is rigidly secured to a base 18. Within the cylinder is a measuring chamber 20 which may extend entirely across the cylinder from one end thereof to the other, but which is provided with straight parallel side walls and with a movable bottom 21 fitting snugly between said walls. The end of the chamber opposite to its bottom is normally open and the cylinder may be rotated about its own axis to bring said open end into register with an inlet port 22 Fig. 6, through which the coffee can flow freely from the container into the measuring chamber when the container is in its inverted position. After the chamber has been filled in this manner the cylinder can then be revolved into a diametrically opposite position in which its open end will be brought into register with the discharge port 23 in the casing, as shown in Fig. 7. If the container is still maintained in its inverted position the coffee will drop freely out of the measuring chamber by gravity. Consequently, uniformly measured quantities of coffee can be dispensed from the container at each operation of the measuring device. In addition, the cylinder fits tightly within the casing and the joint between the measuring device and the container is made relatively tight so that while the apparatus is not air tight in the strict scientific sense of that term, nevertheless it is sufficiently tight to prevent any substantial interchange of gaseous constituents between the interior of the apparatus and the outside atmosphere. Consequently, the aroma and freshness of the coffee will be preserved for a very considerable length of time, usually for such a period that the entire supply will have been used before any substantial deterioration has occurred.

In order to enable the user to adjust the volume of the measuring chamber 20 to her individual requirements, a screw 25 is threaded through the bottom piece 21 and the head of this screw is held between the wall of the cylinder 16 and a buckled plate 26 which fits tightly between the walls of the chamber below the bottom 21. A hole 27 through the cylinder 16 and in line with the screw head permits the introduction of a screw driver blade to rotate the screw. When so rotated it moves the bottom 21 upward or downward, depending upon the direction of such rotation. In assembling these parts the buckled plate 26, with the screw 25 projecting through it, is inserted in the measuring chamber and is slid downwardly until the margins of the plate bring up on the inner wall of the cylinder. The plate tends to straighten and its corners therefore dig into the walls of the chamber and effectually resist any tendency to move the plate upwardly. A washer 28 may or may not be used between the head of the screw and the plate 26.

For convenience in assembling the cylinder 16 in its casing, the casing is made with one open end, as indicated in Fig. 5, so that the cylinder may simply be slipped into it and then secured against removal by means of a screw 29 with its inner end riveted over. The outer end of the cylinder is provided with a thumb piece 30 for convenience in revolving the cylinder. A pin 31, Fig. 1, cooperates with shoulders on the exposed end of the cylinder to limit the rotative movement of the cylinder to approximately a half turn.

The construction above described provides a dispensing container in which a supply of coffee can be kept indefinitely and from which measured quantities can be discharged as needed. At the same time the construction of the apparatus is such that deterioration of the coffee will be reduced to an extremely low and tolerable rate. In addition, it provides an apparatus suited to the requirements of individual proprietors since they can furnish their customers with a dispensing apparatus which will require the use of a locking ring 4 of a certain definite size. By adopting a size different from that of a competitor a proprietor can make it extremely difficult, if not impossible, for a customer to use this device with a competitor's coffee.

For those proprietors who put up their coffee in cans, it is entirely feasible to use cans such as those shown in Figs. 8 and 10. In the former the top of the can 32 is provided with a series of inwardly bent integral spring lugs 33 similar to the lugs 9 and 10, which will snap into the groove 8 of the base 18 of the measuring device 3 when this device is inserted in the top of the can, as indicated in Fig. 8, thus locking the measuring device securely and non-removably to the can. Such a can may be provided with a tear strip, or the edge of the base 18 may be grooved vertically, as shown at 34 in Fig. 5, to permit the introduction of a sharp pointed instrument behind the upper edge of the can where it can be forced downwardly and tear the top of the can open. The margin of the can can then be forced outwardly a little at a time until the entire base of the measuring device is freed from it. The top of the can 32 is designed to be closed by a cover 35, Fig. 9.

Fig. 10 shows the general type of can used by those proprietors who seal their coffee in inert gas, vacuum, or the like. These cans have a circumferential tear strip or rip strip, the end of which is shown in Fig. 10 at 36, this strip being formed in the outer wall of the can. Such a can usually, or at least frequently, has an inner rim 37 over which the top can fit frictionally when the can has been opened by tearing out the strip 36. For the purposes of this invention the rim 37 is provided with integral inwardly bent spring fingers or lugs 38, like the lugs 33, and adapted to enter the groove 8 of the base 18 of the measuring device and lock this base to the top of the can after the cover has been removed, in exactly the manner that the lugs 33 lock the measuring device to the can 32 in the construction above described.

This apparatus thus is useful both with coffee sold in bulk and also with that sealed in tin cans or similar containers. In addition, the apparatus is useful even without the ring 4, the base of the measuring device being secured to the jar by the ordinary screw connection, by a bayonet joint, or by any other releasable connection, such as those commonly used for securing a cover to a jar.

While we have herein shown and described preferred embodiments of our invention, it will be understood that the invention may be embodied in other forms without departing from the spirit or scope thereof.

Having thus described our invention, what we desire to claim as new is:

1. An apparatus of the character described, comprising a container, a volumetric measuring device, and means for securing said device to said container against removal therefrom, comprising a ring carried by said container and provided with a plurality of spring lugs, and said device having a connecting part to be engaged by said lugs whereby such engagement will non-releasably secure said device to said container.

2. An apparatus of the character described, comprising a container, a volumetric measuring device, and means for securing said device to said container against removal therefrom, comprising a ring carried by said container and provided with a plurality of spring lugs, and said device having a connecting part to be engaged by said lugs whereby such engagement will non-releasably secure said device to said container, said ring including a portion readily breakable to permit the release of said device when desired.

3. An apparatus of the character described, comprising a dispensing device including a casing, a cylinder mounted therein for rotative movement about the axis of the cylinder, said cylinder having an open ended measuring chamber, and said casing having inlet and discharge openings with which said chamber may be brought into register at different points in its rotative movement to fill and discharge the chamber, said measuring chamber including a straight sided portion of substantially uniform internal diameter, a bottom mounted in said straight sided portion, a screw threaded through said bottom and having its head located within said cylinder, and a buckled retaining plate for said head located between the head of said screw and said bottom and jammed against the walls of the chamber to hold it in its buckled position.

4. An apparatus of the character described, comprising a container, a volumetric measuring device, and means for securing said device to said container against removal therefrom, comprising a ring carried by said container and having parts for operatively engaging parts of said device to positively prevent the release of said device from said container without substantially destroying the ring.

5. An apparatus of the character described, comprising a container, a volumetric measuring device, and means for securing said device to said container against removal therefrom, comprising a ring having parts adapted to be operatively engaged with parts of one of said elements by a movement in a given direction, but thereafter positively preventing the separation of said elements, whereby an essential part of the apparatus must be substantially destroyed in order to remove said device from said container.

6. An apparatus of the character described, comprising a container, a volumetric measuring device, and means for securing said device to said container against removal therefrom, comprising a ring carried by said container and having parts for operatively engaging parts of said device to positively prevent the release of said device from said container, said ring having a breakable portion to permit the rupture of the ring when it is desired to remove said device from said container.

7. An apparatus of the character described, comprising a dispensing device including a casing, a cylinder mounted therein for rotative movement about the axis of the cylinder, said cylinder having an open ended measuring chamber, and said casing having inlet and discharge openings with which said chamber may be brought into register at different points in its rotative movement to fill and discharge the chamber, a container, and a unitary metallic locking means for securing said device to said container in such a manner that they cannot be separated without destroying said locking means.

8. An apparatus of the character described comprising a container, a volumetric measuring device, and a unitary non-releasable metallic locking device for so securing together said container and said measuring device that the separation of said measuring device from said container is rendered impossible without destroying said locking device.

9. An apparatus of the character described, comprising a container adapted to hold a quantity of coffee or other granular material, a volumetric measuring device operable to discharge said material from the container in definite measured quantities but so joined to said container as to normally maintain said container closed against any substntial interchange of air with the outside atmosphere, and a unitary non-releasable metallic locking device for so securing said measuring device to said container that the separation of the measuring device from the container is rendered impossible without destroying said locking device.

10. A locking ring formed of a strip having a series of inwardly bent spring lugs struck up from the body of the ring below the upper edge thereof and a series of inwardly bent spring lugs struck up from the body of the ring above the lower edge thereof, the free ends of the two series of lugs projecting in opposite directions, one end of said strip overlapping the other, and means forming a separable joint between the overlapped portions, said end projecting freely from said joint.

CHARLES R. LOTHROP.
OSWALD CAMMANN.